Sept. 6, 1960 W. S. HAYES 2,952,011
SIGNAL MECHANISMS
Filed Nov. 7, 1958 3 Sheets-Sheet 1
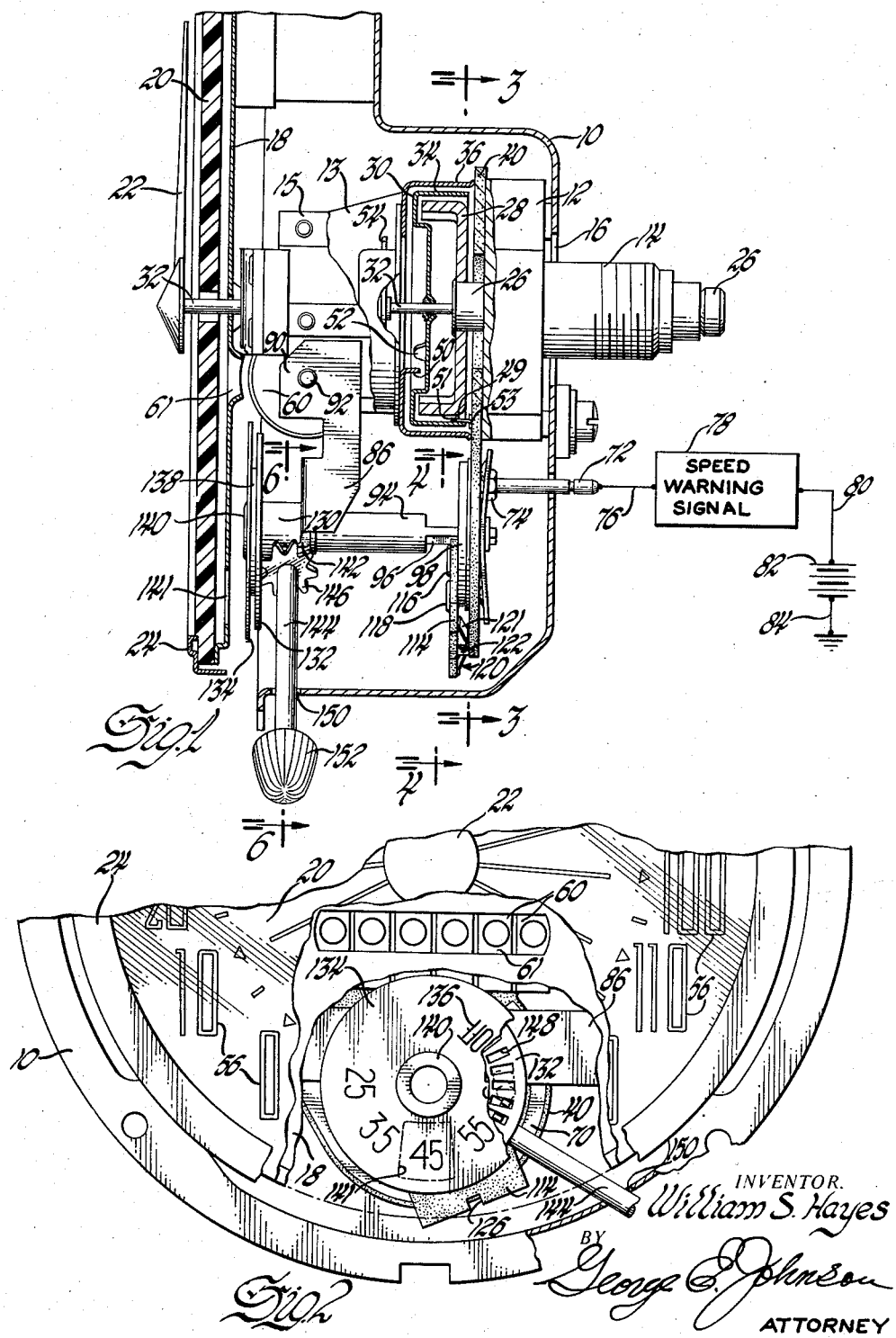

Sept. 6, 1960 W. S. HAYES 2,952,011
SIGNAL MECHANISMS
Filed Nov. 7, 1958 3 Sheets-Sheet 2
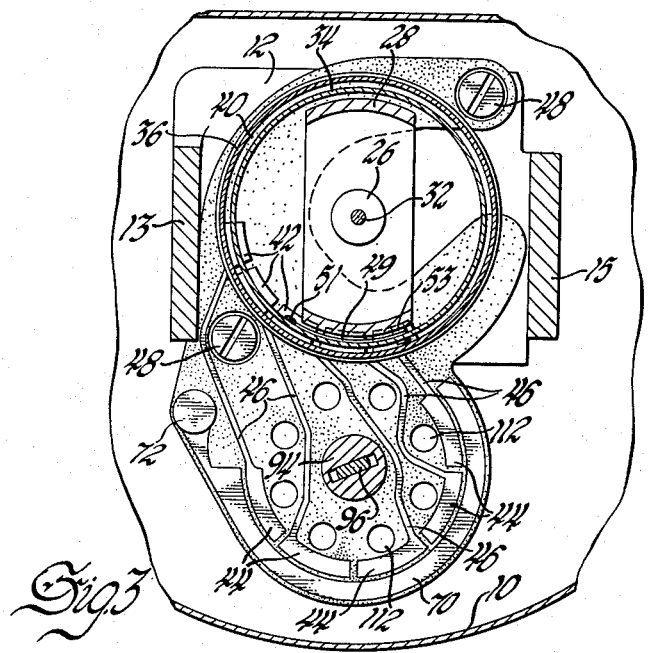
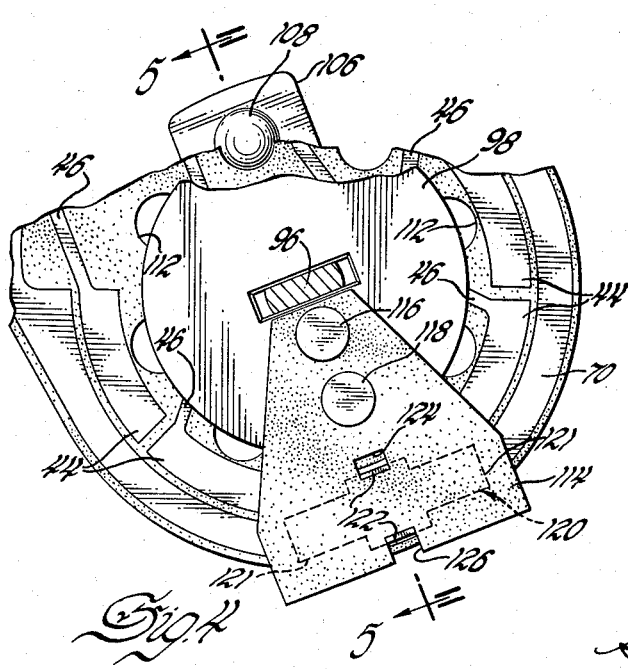
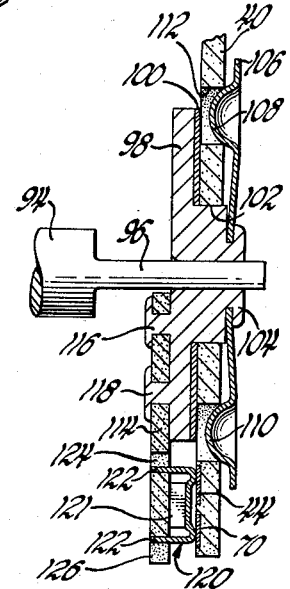
INVENTOR.
William S. Hayes
BY
George E. Johnson
ATTORNEY

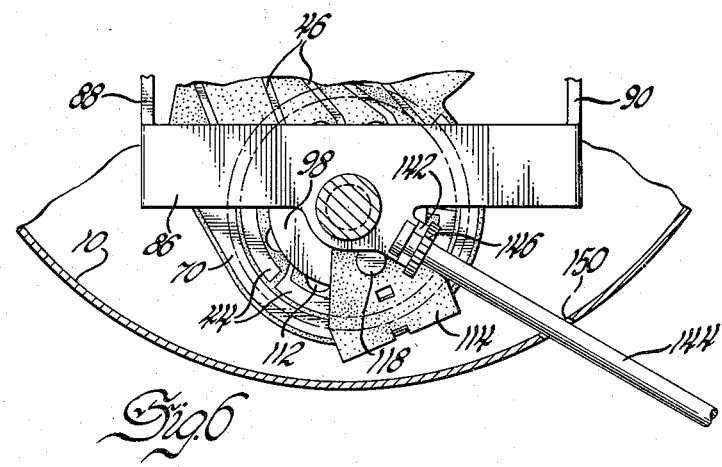
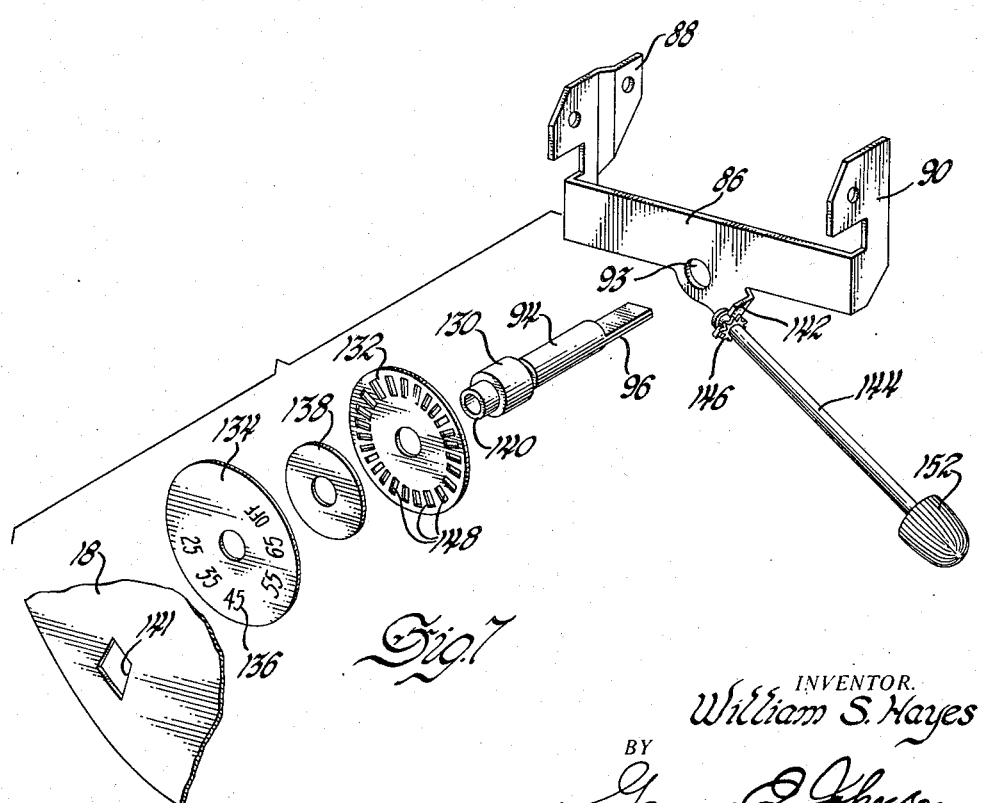

United States Patent Office 2,952,011
Patented Sept. 6, 1960

2,952,011
SIGNAL MECHANISMS

William S. Hayes, Flint, Mich., assignor to General Motors Corporation, Detroit, Mich., a corporation of Delaware Filed Nov. 7, 1958, Ser. No. 772,578
1 Claim. (Cl. 340—263)

This invention relates to signal mechanisms and more particularly to mechanisms adapted to warn an operator that a predetermined and variable condition has been reached such as the effecting of a given vehicle speed on a predetermined range or reading of an indicating instrument.

Signal mechanisms associated with indicating instruments such as speedometers have become increasingly common as their advantages are obvious. They are particularly useful in connection with automobile speedometers as they eliminate the necessity for drivers to watch their instruments. Full attention may be given to road conditions and the warning signals remain effective through the use of sound or light effects giving emphasis as required. It is also obvious that a given instrument, provided with the signal mechanism, should be as compact as possible and also simple, reliable, low in cost and easy to read.

An object of the present invention is to provide an improved signal mechanism intimately associated with an indicating instrument in the interest of compactness, simplicity, reliability and low cost. Another object is to provide an instrument in which no supplemental pointers are used thereby expediting instrument readability.

A feature of the invention is a signal mechanism utilizing selective electrical contacts in the case of an indicating instrument having a speed cup such as used in speedometers. Another feature is a signal mechanism employing an indicator operative under predetermined and preselected conditions and separate from a normally operative indicator pointer and its axis insofar as the viewer is concerned in securing normal instrument reading, but located in the same instrument casing for view through the exposed face of the instrument.

These and other important features of the invention will now be described in detail in the following specification and then pointed out more particularly in the appended claims.

In the drawings:

Fig. 1 is a sectional view taken through a speedometer in which a signal mechanism, as one embodiment of the present invention, is included, the necessary circuitry being shown diagrammatically;

Fig. 2 is a partial front view of the speedometer of Fig. 1, parts being broken away better to illustrate constructional details;

Fig. 3 is a sectional view looking in the direction of the arrows 3—3 in Fig. 1;

Fig. 4 is a sectional view looking in the direction of the arrows 4—4 in Fig. 1, the view being drawn to a larger scale;

Fig. 5 is a sectional view along the line 5—5 in Fig. 4;

Fig. 6 is a sectional view looking in the direction of the arrows 6—6 in Fig. 1; and Fig. 7 is an exploded view, in perspective, of parts shown in Figs. 1, 2 and 6.

The drawings illustrate a signal mechanism including a casing 10 of a speedometer, this instrument being much like that disclosed in the United States Patent No. 2,073,153 granted March 9, 1937, in the name of Ralph O. Helgeby, insofar as the speed indicating elements are concerned. The conventional parts of such an instrument comprise a die-cast frame 12 having a tubular shank 14 projecting from the casing through an aperture 16, a dial 18, a transparent plate 20, a pointer 22 and a bezel 24. The latter and the casing 10 may be fixed to an instrument panel by means not shown but well known in the art. A drive shaft 26 is journaled in the shank 14 and drives a U-shaped magnet 28. The shaft 26 is adapted to be driven by a flexible shaft running from the vehicle transmission as is customary. A speed cup 30 is fixed to a spindle 32, its peripheral or cylindrical wall 34 surrounding the two legs of the magnet 28. A field cup 36 surrounds the speed cup 30 and is supported nonrotatively on but out of contact with the frame 12. Interposed between the stationary field cup 36 and the frame 12 is a plastic plate 40 having spaced copper inserts or printed contacts thereon. These inserts are in the form of a first series of five contacts or segments 42 (Fig. 3) arranged in an arc coaxial with the shaft 32 and a second series of five contacts or segments 44 arranged in an arc below the field cup 36. Each contact 42 is connected to a contact 44 by a thin line 46 of conductive metal. The plastic plate 40 is fixed to the frame 12 by screws 48. A first main contact element in the form of a spring arm 49 is adapted to rotate with the speed cup 30. One end of the arm is fixed as at 51 to the cup. The other end is in the form of a slidable shoe 53 resiliently engaging the plate 40 or one of the contacts 42.

A tongue 50 is bent inwardly as a part of the field cup 36 to engage a lug 52 on the speed cup 30 to limit the rotating influence in one direction of a helical spring 54 fixed to the spindle 32. Contact of the tongue 50 and the lug 52 indicates zero speed by the pointer 22 with respect to the symbols 56 on the dial 18. The instrument is also provided with a conventional odometer drum set 60 visible through a window 61 formed in the dial. Side pieces 13 and 15 of the die-cast frame 12 enclose main parts of the speedometer which are of no moment insofar as the present invention is concerned. It will be understood that the spindle 32 is rotatable to rotate the pointer 22 and that the dial 18 and associated parts are fixed relative to the instrument panel. All parts thus far referred to are conventional except for the plastic of printed circuit plate 40 and the inserts or contacts thereon, and it will be appreciated that rotation of the shaft 26 will conventionally cause the magnet 28 to impart a rotative effect on the speed cup 30 in proportion to vehicle speed and against the helical spring 54 to indicate a reading of the instrument by virtue of the position assumed by the pointer 22 relative to the dial 18.

As seen in Figs. 1 and 3, the plastic plate 40 extends downwardly into the lower zone of the speedometer casing 10 and it is to the depending portion of the plate that the aforementioned second series of contacts 44 are mounted. Coaxial with these contacts is a main segment 70 extending about 235° about the axis of the contacts and one end of which is joined to a terminal 72. The terminal 72 is in the form of a bolt and the plate 40, as well as the segment 70, is held between the head of the bolt and a nut 74. The other end of the terminal 72 is attached by means of a line 76 to a speed warning device 78. This could be in the form of a light bulb or a buzzer or some other device giving an audible or visible signal. The circuit through the speed warning device 78 is completed by a line 80 leading to a battery 82 and a line 84 leading to ground. It will be appreciated that the casing 10 of the instrument is suitably grounded.

A U-shaped bracket 86 is best illustrated in Fig. 7 and the side legs 88 and 90 of this bracket are fixed by means of rivets such as the rivet 92 to the side pieces 13 and 15 of the die-cast frame 12. The bracket 86 is apertured as at 93 (Fig. 7) for the reception of a shaft 94. One end of the latter bears a flat tongue 96 which is inserted through the hub of a disk 98 to rotate therewith. The hub of the disk 98 extends through a non-conductive washer 100 (Fig. 5) and an aperture 102 formed in the plate 40. It will be appreciated that the disk 98 is rotatable within the aperture 102. The hub of the disk 98 is upset as at 104 to fix a spring member 106 into non-rotative relation with respect thereto. The spring member 106 is elongated and has detent knobs 108 and 110 formed at opposite ends thereof and these detent knobs are adapted to engage a circular series of openings 112 formed in the plate 40. A non-conductive plastic plate 114 of generally triangular configuration is fixed to the disk 98 by means of upset projections 116 and 118 made integral with the disk. Interposed between the plastic plate 40 with its second series of contacts 44 is a second main contact element or contact slider 120. This slider is formed of one piece of spring metal having oppositely opposed legs 121 resiliently resting against the surface of the plastic plate 114. Two other legs 122 are oppositely disposed but extend normally to the surface of the plate 114 and into an opening 124 and a notch 126 formed in the latter.

The end portion of the shaft 94 nearest the dial 18 bears an enlarged length portion 130 (Fig. 7), against one shoulder of which is carried a gear wheel 132. A disk 134 is also mounted on the shaft 94 and is provided with symbols 136. Interposed between the gear wheel 132 and the disk 134 is a washer 138. The end 140 of the shaft 94 is upset after assembly of the disks on the shaft to hold the parts as shown in Fig. 1. The dial 18 is provided with a four-sided opening 141 so positioned as to register with one of the symbols 136 for visual observation of the latter through the transparent plate 20.

The U-shaped bracket 86 bears a tang 142 in which is journaled one end of a shaft 144. The latter carries a gear 146 which meshes with the openings 148 forming teeth in the gear wheel 132. The shaft 144 extends downwardly and to one side of the instrument casing, emerging from an opening 150 formed in the casing. The exposed end of the shaft 144 bears a knurled knob 152 whereby the operator may manually rotate the shaft and gearing as will further appear.

The above description indicates the mode of operation to a certain extent for it is obvious that rotation of the knob 152 will position a symbol 136 in registry with the opening 141 of the dial. Assuming that the symbol 45 is placed in registry with opening 141 to constitute a predetermined or selected speed at which a warning should be given, an appropriate segment of the second series of contacts 44 will be connected to the main segment 70 by the slider or second main contact element 120. When the speedometer pointer 22 assumes a position indicating 45 m.p.h. as the speed attained by the vehicle, the first main contact element or spring arm 49 will be positioned accordingly by the accompanying rotation of the speed cup 30. The current from the battery circuit will pass through the printed circuit and be grounded through the instrument casing. As a result, the speed warning signal 78 will be operated and the operator will know that he has reached the preselected speed of 45 m.p.h.

In selecting a predetermined speed, the detent knobs 108 and 110 will hold the shaft 94 and the dial 134 as well as the slider 120 in the position selected.

I claim:

A signal mechanism comprising a casing, a grounded and magnetically driven speed cup mounted in said casing and rotatable on its own axis an extent indicating a measurement, a first main contact element fixed to the periphery of said cup for rotation therewith, a first series of contacts fixed within said casing and positioned consecutively and individually to be contacted by said first main contact element as said cup is rotated, a second series of contacts fixed within said casing and connected to said first series in parallel, a main contact segment arranged with said second series of contacts about a common axis, a second main contact element slidably engaging said main contact segment, manually operative means extending into said casing for rotating said second main contact element into selective engagement with one contact of said second series of contacts, a window in said casing, a dial with symbols rotatable with said manually operative means, said symbols being positioned selectively to register with said window when said dial is rotated, and an electrical circuit including a warning device, said main contact segment, said main contact elements and one contact of each of said series of contacts, and said speed cup.

References Cited in the file of this patent
UNITED STATES PATENTS

| | | |
|---|---|---|
| 2,679,023 | Wennberg | May 18, 1954 |
| 2,728,072 | Magid | Dec. 20, 1955 |
| 2,785,393 | Mininberg | Mar. 12, 1957 |